(12) United States Patent
Singh et al.

(10) Patent No.: US 7,092,075 B2
(45) Date of Patent: Aug. 15, 2006

(54) APPARATUS AND METHOD FOR DETECTING OBSTACLES

(75) Inventors: Sanjiv Singh, Pittsburgh, PA (US); Parag Batavia, Seven Fields, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 348 days.

(21) Appl. No.: 10/438,788

(22) Filed: May 15, 2003

(65) Prior Publication Data

US 2005/0088642 A1   Apr. 28, 2005

Related U.S. Application Data

(60) Provisional application No. 60/380,983, filed on May 15, 2002.

(51) Int. Cl.
*G01C 3/08*   (2006.01)
(52) U.S. Cl. .................. 356/4.01; 356/3.01; 356/4.01; 356/5.01
(58) Field of Classification Search ................ 356/4.01
See application file for complete search history.

(56) References Cited

U.S. PATENT DOCUMENTS

| | | | |
|---|---|---|---|
| 5,455,669 A | 10/1995 | Wetteborn | |
| 5,574,463 A | 11/1996 | Shirai et al. | |
| 5,604,580 A * | 2/1997 | Uehara | .................. 356/28 |
| 5,831,717 A * | 11/1998 | Ikebuchi | ................. 356/4.01 |
| 5,903,355 A | 5/1999 | Schwarz | |
| 6,176,587 B1 * | 1/2001 | Fredricks | .................. 359/843 |
| 6,223,110 B1 * | 4/2001 | Rowe et al. | ................ 701/50 |
| 6,330,523 B1 | 12/2001 | Kacyra et al. | |
| 2002/0003489 A1 | 1/2002 | Samukawa et al. | |

OTHER PUBLICATIONS

P. Batavia and D. Pomerleau and C. Thorpe, "Overtaking Vehicle Detection Using Implicit Optical Flow," Proceedings of the IEEE Intelligent Transportation Systems Conference, Boston, MA, 1997.
P. Batavia, and S. Singh, "Obstacle Detection Using Adaptive Color Segmentation and Color Homography," Proceedings of the Int'l Conference on Robotics and Automation. IEEE, May 2001.
P. Bellutta et. al., "Terrain Perception for Demo III," Proceedings of the IEEE Intelligent Vehicles Symposium 2000, Dearborn, MI, 2000.
M. Bertozzi and A. Broggi and A. Fascioli, "Stereo Inverse Perspective Mapping: Theory and Applications," Image and Vision Computing, vol. 16, pp. 585-590, 1998.
T. Chang., et. al., "Concealment and Obstacle Detection for Autonomous Driving." Proceedings of the Int'l Association of Science and Technology for Development—Robotics and Applications Conference, Santa Barbara, CA, 1999.

(Continued)

*Primary Examiner*—Thomas H. Tarcza
*Assistant Examiner*—Luke D. Ratcliffe
(74) *Attorney, Agent, or Firm*—Kirkpatrick & Lockhart Nicholson Graham LLP

(57) ABSTRACT

A method for detecting an obstacle in a spatial area is disclosed. The method includes scanning the spatial area, classifying each reflection point in the spatial area as one of an obstacle reflection point and a non-obstacle reflection point, fusing the obstacle reflection points, and generating statistics associated with the obstacle.

19 Claims, 3 Drawing Sheets

OTHER PUBLICATIONS

J. Hancock et al., "Active laser radar for high performance measurements," Proceedings of the IEEE International Conference on Robotics and Automation, 1998.

J. Hyams and M. Powell and R. Murphy, "Cooperative Navigation of Micro-rovers using Color Segmentation," Autonomous Robots, vol. 9, No. 1, pp. 7-16, Aug. 2000.

J. Inberg, et al., "CAN-Bus in a Closed Loop Hydraulic Position Servo," presented at Fifth International Conference on Fluid Power Transmission and Control (ICFP 2001), Zhejiang University, Hangzhou, China, Apr. 3-5, 2001.

D. Langer and T. Jochem, "Fusing Radar and Vision for Detecting, Classifying, and Avoiding Roadway Obstacles," Proceedings of the IEEE Symposium on Intelligent Vehicles, 1996.

R. Mandelbaum et. al. "Real Time Stereo Processing, Obstacle Detection, and Terrain Estimation from Vehicle-Mounted Stereo Cameras," Proceedings of the Applications of Computer Vision, 1998.

M. Ollis, "Perception Algorithms for a Harvesting Robot," Carnegie Mellon University Doctoral Dissertation, CMU-RI-TR-97-43, Aug. 1997.

P.J. Rousseeuw and K. Van Driessen., "Computing LTS Regression for Large Data Sets," Technical Report, University of Antwerp, 1999.

N. Roy, et al., "Towards Personal Service Robots for the Elderly," Proceedings of the Workshop on Interactive Robots and Entertainment, 2000.

J. Santos-Victor and G. Sandini, "Uncalibrated Obstacle Detection Using Normal Flow," Machine Vision and Applications, vol. 9, pp. 130-137, 1996.

K. Storjohann and T. Zielke and H.A. Mallot and W. von Seelen, "Visual Obstacle Detection for Automatically Guided Vehicles," Proceedings of the International Conference on Robotics and Automation, pp. 761-766, 1990.

I. Ulrich and I. Nourbakhsh, "Appearance-Based Obstacle Detection," AAAI National Conference on Artificial Intelligence, Austin, TX, Aug. 2000.

C. Urmson and M.B. Dias, "Stereo Vision Based Navigation for Sun-Synchronous Exploration," Proceedings of the International Conference on Robotics and Automation, 2002, IEEE, May 2002.

P.A. Veatch and L.S. Davis., "Efficient Algorithms for Obstacle Detection Using Range Data," Computer Vision, Graphics, and Image Processing, 50 (1), Apr. 1990.

\* cited by examiner

APPARATUS AND METHOD FOR DETECTING OBSTACLES

CROSS-REFERENCE TO RELATED APPLICATION

This application claims priority under 35 U.S.C. § 119(e) from provisional U.S. Patent Application Ser. No. 60/380,983 filed May 15, 2002, which is incorporated herein by reference.

BACKGROUND

The present application is related, generally, to a method and apparatus for detecting obstacles in an outdoor environment. For outdoor environments having a high curvature terrain, reliable identification of an obstacle located therein can be a difficult task. The natural rise and fall of the terrain can easily be misconstrued as an obstacle or even result in an obstacle going undetected.

It is known in the art to use range imagery from stereo vision or radar to detect obstacles in an outdoor environment. Although each approach has certain advantages, each approach also has certain shortcomings and limitations. For example, stereo vision can provide relatively dense range imagery. However, for certain terrain textures and lighting conditions, stereo vision generally can not provide the range resolution necessary to reliably detect small obstacles. Radar is immune to a large range of environmental conditions and works well for detecting relatively large obstacles. However, radar frequently only provides a generalized location for the obstacles that it does detect, and its relatively large beam size can preclude the detection of small obstacles altogether.

It is also known in the art to detect obstacles using laser ranging. Single-axis scanners provide range data from one scan direction in one plane. Although single-axis scanners are relatively inexpensive, the amount of information they provide is limited to information obtained from a single scan direction in one plane. As a result, discontinuities in the range data caused by pitching motion experienced by the single-axis scanner are often misinterpreted as being caused by an obstacle in the spatial area being scanned. In addition, such pitching motion can cause the single-axis scanner to miss an obstacle entirely. Two-axis scanners provide range data from two directions in a cone, and have the range and resolution capability to directly measure the shape of an obstacle. Although two-axis scanners are less susceptible to misinterpreting discontinuities in the range data, they are relatively expensive, difficult to make robust to motion, and require a great amount of processing to handle the data. Thus, it is not generally commercially feasible to use a two-axis scanner for obstacle detection applications.

SUMMARY

In one general respect, the present invention is directed to a method for detecting an obstacle in a spatial area. According to one embodiment, the method includes scanning the spatial area, classifying each reflection point in the spatial area as one of an obstacle reflection point and a non-obstacle reflection point, fusing the obstacle reflection points, and generating statistics associated with the obstacle.

In another general respect, the present invention is directed to an apparatus for detecting an obstacle in a spatial area. According to one embodiment, the apparatus includes a single axis laser range finder configured for scanning the spatial area in elevation, an assembly connected to the single axis laser range finder, a synchronizer in communication with the single axis laser range finder and the assembly, and a processor in communication with the synchronizer. The assembly is for sweeping the single axis laser range finder in azimuth. The processor includes a classifying module for classifying data received from the synchronizer as being representative of one of an obstacle and a non-obstacle, a fusing module for fusing the data representative of the obstacle, and a generation module for generating statistics associated with the obstacle.

DESCRIPTION

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

Figure 1:
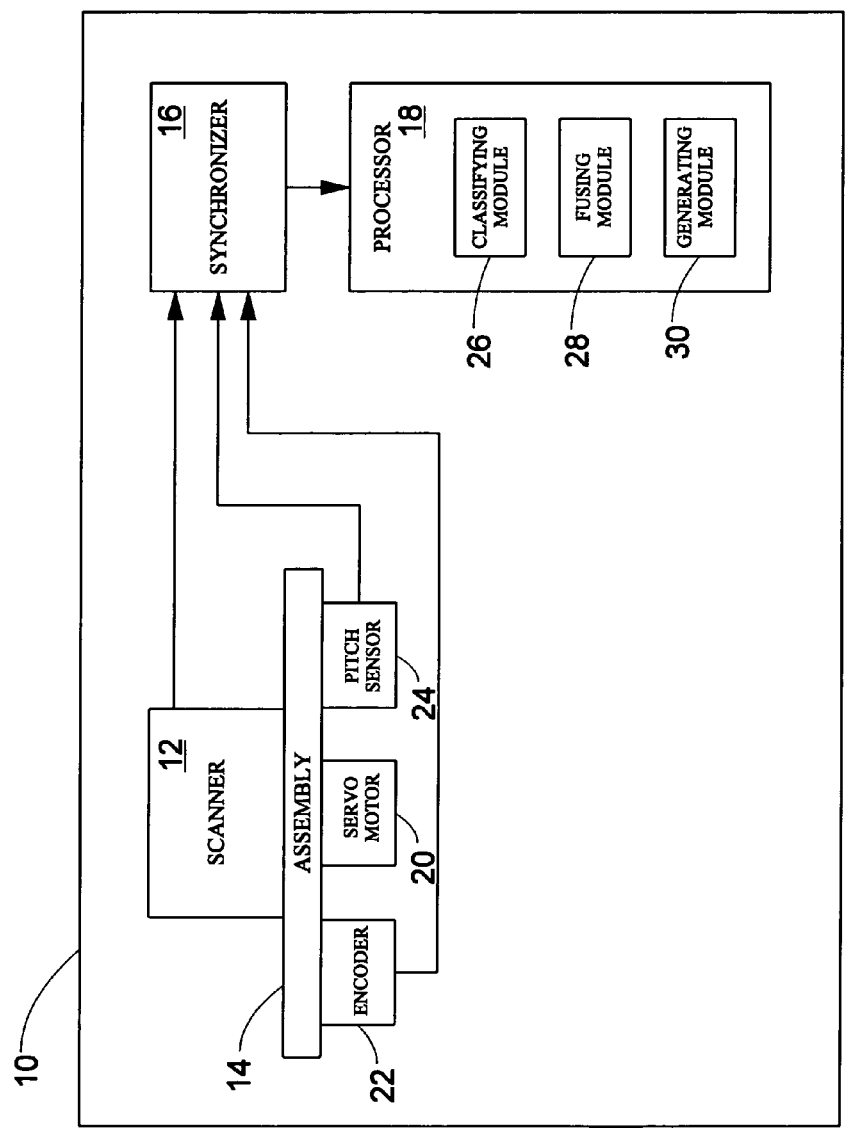
FIG. 1 illustrates one embodiment of an apparatus for detecting an obstacle in a spatial area.

FIG. 1 illustrates one embodiment of an apparatus 10 for detecting an obstacle in a spatial area. The apparatus 10 may include a single axis laser range finder 12, an assembly 14, a synchronizer 16 and a processor 18.

The single axis laser range finder 12 is configured for scanning the spatial area in elevation. The single axis laser range finder 12 may be embodied as a conventional single axis laser ranger finder rotated by ninety degrees to scan vertically instead of horizontally. As configured, the single axis laser range finder 12 may emit a succession of light pulses over a predetermined angular range at a predetermined frequency. According to one embodiment, the single axis laser range finder 12 may be configured to scan in elevation over a 100° angular range at a frequency of seventy-five scans per second. According to other embodiments, the single axis laser range finder 12 may be configured to scan in elevation over angular ranges which are greater than or less than 100°, and at frequencies which are greater than or less than seventy-five scans per second. For example, according to one embodiment, the single axis laser range finder 12 may be configured to scan in elevation at a frequency of two-hundred to three-hundred scans per second.

The assembly 14 is connected to the single axis laser range finder 12, and is for sweeping the single axis laser range finder 12 in azimuth. The assembly 14 may include a servo-motor 20, and may include an encoder 22 for determining the yaw position and sweep angle of the single axis laser range finder 12 while it is being swept by the assembly 14. The assembly 14 may also include a sensor 24 for sensing the pitch of the assembly 14, and therefore, the pitch of the single axis laser range finder 12 connected thereto. According to one embodiment, the assembly 14 may be configured to sweep the single axis laser range finder 12 in azimuth over a predetermined angular range at a predetermined frequency. For example, according to one embodiment, the assembly 14 may be configured to sweep the single axis laser range finder 12 in azimuth over a 90° angular range at a frequency of one sweep per second. According to other embodiments, the assembly 14 may be configured to sweep the single axis laser range finder 12 in azimuth over angular ranges which are greater than or less than 90°, and at frequencies which are greater than or less than one sweep per second.

The synchronizer 16 is in communication with the single axis laser range finder 12 and the assembly 14, and may receive scan information from the single axis laser range finder 12, sweep angle information from the assembly 14, and pitch information from the assembly 14. The synchronizer 16 is for synchronizing each scan from the single axis laser range finder 12 with the correct sweep angle and with the appropriate pitch information. The synchronizer 16 may be implemented as any general purpose synchronizer suitable for time-synchronizing information received from multiple sources.

The processor 18 is in communication with the synchronizer 16, and may be, for example, a central processing unit (CPU) including, e.g., a microprocessor, an application specific integrated circuit (ASIC), or one or more printed circuit boards. The processor 18 may include a classifying module 26, a fusing module 28, and a generation module 30. The classifying module is for classifying data received from the synchronizer 16 as being representative of one of an obstacle and a non-obstacle. The fusing module 28 is for fusing the data representative of the obstacle. The generation module 30 is for generating statistics associated with the obstacle.

The modules 26, 28, 30 may be implemented as microcode configured into the logic of the processor 18, or may be implemented as programmable microcode stored in electrically erasable programmable read only memories (EEPROMs). According to another embodiment, the modules 26, 28, 30 may be implemented as software code to be executed by the processor 18. The software code may be written in any suitable programming language using any suitable programming technique. For example, the software code may be written in C using procedural programming techniques, or in Java or C++ using object oriented programming techniques. The software code may be stored as a series of instructions or commands on a computer readable medium, such as a random access memory (RAM) or a read only memory (ROM), a magnetic medium such as a hard disk or a floppy disk, or an optical medium such as a CD-ROM.

Figure 2A:
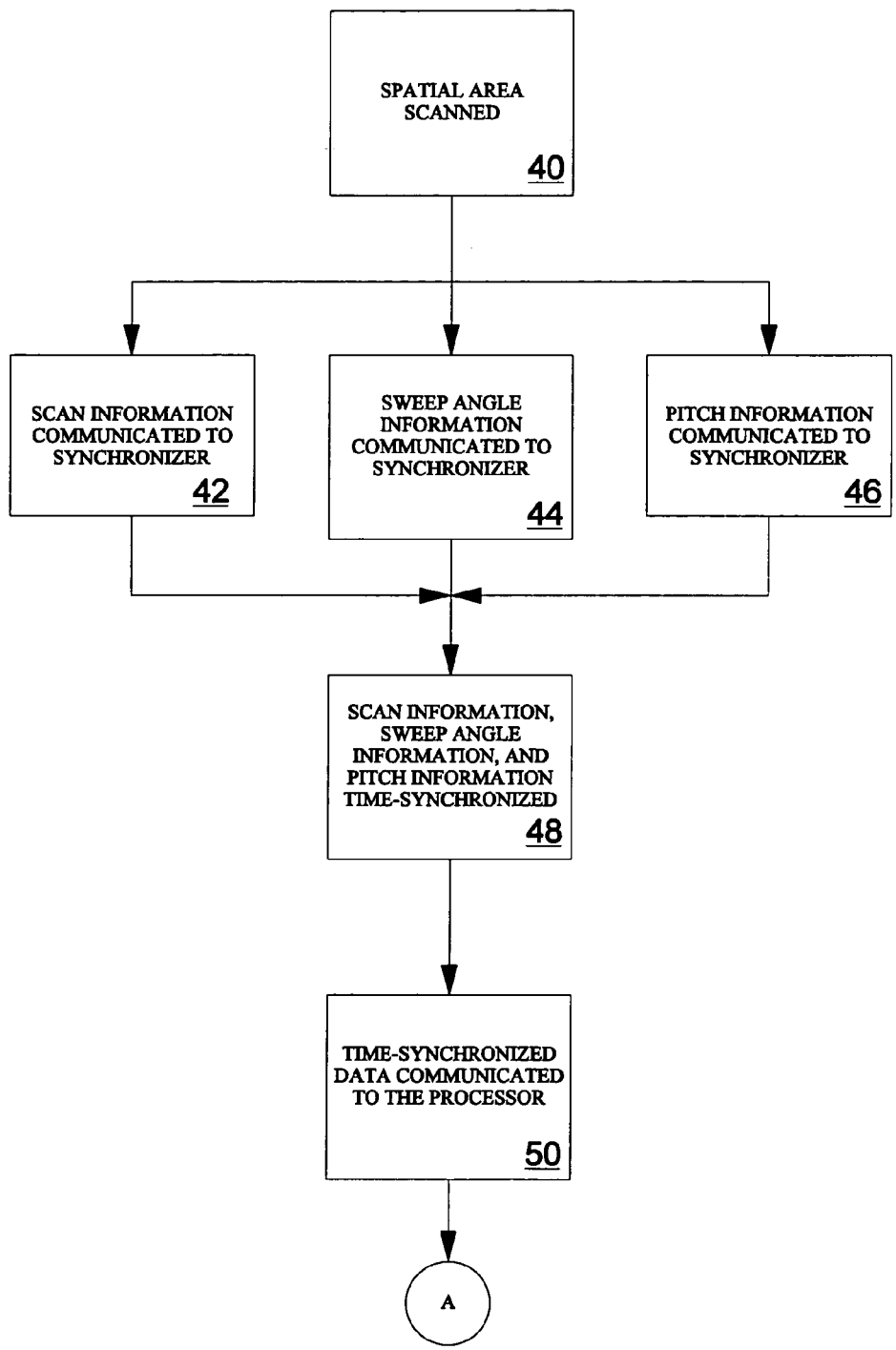
FIGS. 2A and 2B illustrate one embodiment of a process flow for detecting an obstacle in a spatial area with the apparatus of FIG. 1.
Figure 2B:
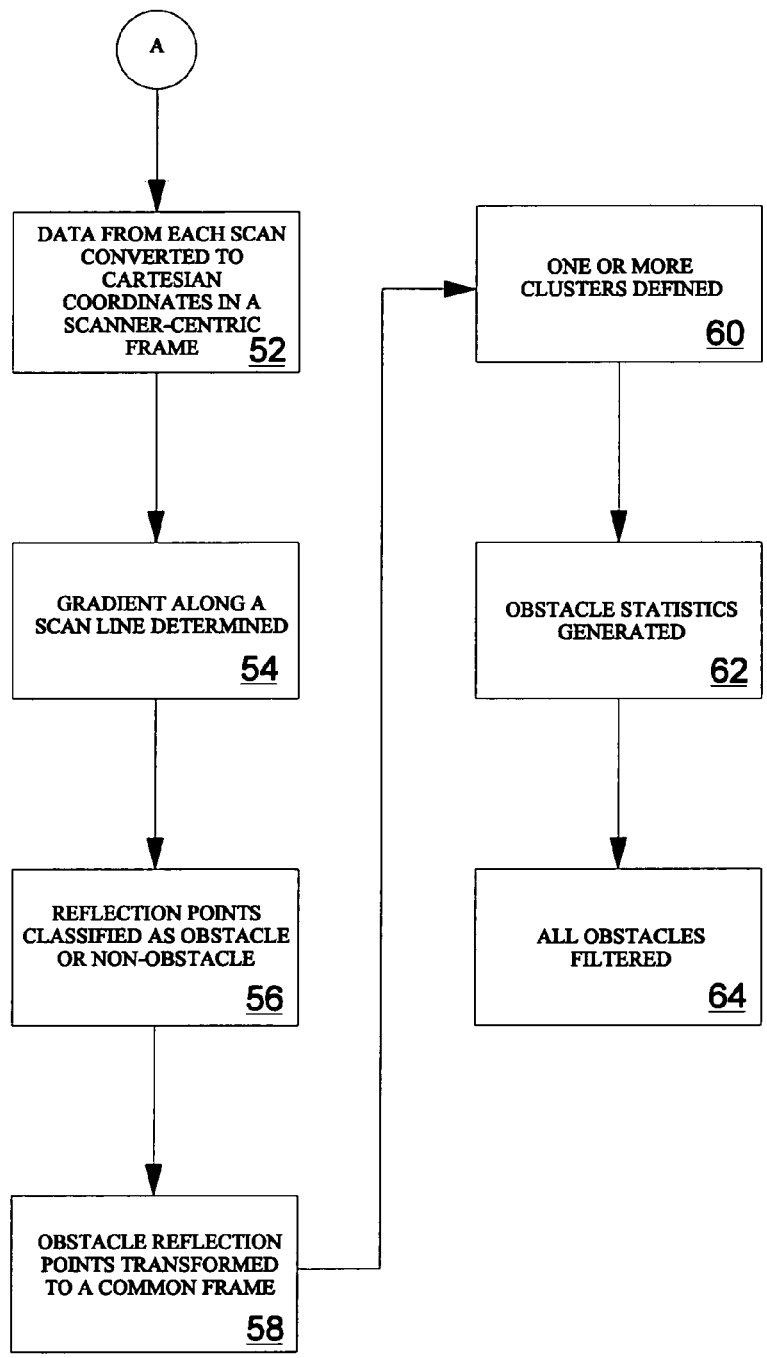

FIGS. 2A and 2B illustrate one embodiment of a process flow for detecting an obstacle in a spatial area with the apparatus of FIG. 1. The process flow begins at block 40, where the apparatus 10 scans the spatial area. The apparatus 10 may scan the spatial area by scanning the spatial area in elevation with the single axis laser range scanner 12 while sweeping the single axis laser range finder 12 in azimuth. The spatial area may be scanned in elevation at a first frequency while the entire single axis laser range finder 12 is swept in azimuth at a second frequency, where the first frequency is much greater than the first frequency. For example, the spatial area may be scanned in elevation at a frequency of seventy five scans per second while the single axis laser range finder 12 is swept in azimuth at a frequency of one sweep per second. Scanning the spatial area may include emitting a succession of light pulses from the single axis laser range finder 12 over a predetermined angular range at a predetermined frequency. The emitted light pulses strike reflection points such as, for example, the ground or an obstacle located in the spatial area, and are reflected back to the apparatus 10. Sweeping the single axis laser range finder 12 in azimuth may include sweeping the single axis laser range finder in azimuth over a predetermined angular range at a predetermined frequency.

From block 40, the process concurrently advances to blocks 42, 44 and 46. At block 42, the apparatus 10 receives the reflected light pulses and communicates the information representative thereof to the synchronizer 16. At block 44, the assembly 14 determines the sweep angle of the single axis laser range finder 12 and communicates the information representative thereof to the synchronizer 16. Because the frequency of the scan is greater than the frequency of the sweep, the single axis laser range finder 12 may sequentially communicate sets of data, where each set of data represents data from a single scan cycle, to the synchronizer 16 over the course of a single sweep. For each set of data communicated to the synchronizer 16, the assembly 14 communicates corresponding sweep angle information to the sychronizer 16. At block 46, the assembly 14 senses any pitching motion experienced by the single axis laser range finder 12 and communicates the pitch information to the synchronizer 16 for each scan cycle.

From blocks 42, 44 and 46, the process advances to block 48, where the synchronizer 16 receives the data from the single axis laser range finder 12 and the assembly 14, respectively, and time-synchronizes the data from each scan with the appropriate sweep angle and pitch information. From block 48, the process advances to block 50, where the synchronizer 16 communicates the time-synchronized data to the processor 18. The time-synchronized data may be communicated to-the processor 18 on a scan by scan basis.

From block 50, the process advances to block 52, where the classifying module 26 converts data representative of each scan to Cartesian coordinates in a scanner-centric frame on a scan by scan basis, thereby generating a scan line for each particular scan. From block 52, the process advances to block 54, where the classifying module 26 determines a gradient along a dimension of each scan line. The respective gradients are determined on a scan line by scan line basis as each scan line is generated. From block 54, the process advances to block 56, where the classifying module 26 classifies each reflection point from a particular scan as an obstacle reflection point or a non-obstacle reflection point based on a predetermined gradient threshold. Reflection points which exceed the predetermined gradient threshold are classified as obstacle reflection points and reflection points which do not exceed the predetermined gradient threshold are classified as non-obstacle reflection points.

From block 56, the process advances to block 58, where only the obstacle reflection points included in a set of the most recently generated scan lines are transformed to a common frame at a predetermined rate. According to one embodiment, the set may be defined to include each of the scan lines generated within the past second of time. According to other embodiments, the set may be defined to include all of the scan lines generated within a time period that is more than or less than the most recent second. The common frame may be considered to lie at the global position of the oldest scan line in the set.

From block 58, the process advances to block 60, where the fusing module 28 defines one or more clusters of obstacle reflection points based on nearest neighbor criterion. From block 60, the process advances to block 62, where the generating module 30 generates statistics associated with the obstacle. The statistics associated with the obstacle may include, for example, the height of the obstacle, the width of the obstacle, the distance the obstacle is positioned from a reference point on the apparatus 10, and an angle the obstacle is positioned relative to a reference point on the apparatus 10. From block 62, the process advances to block 64, where the generation module 30 filters all of the obstacles based on a predetermined size threshold to determine which obstacles are to be considered as true obstacles. The above-described process flow may be repeated any number of times.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A method for detecting an obstacle in a spatial area, the method comprising:
    scanning the spatial area in elevation with a single axis laser range finder at a first frequency while sweeping the single axis laser range finder in azimuth at a second frequency, wherein the first frequency is greater than the second frequency;
    classifying each reflection point in the spatial area as one of an obstacle reflection point and a non-obstacle reflection point on a scan line by scan line basis, wherein classifying each reflection point includes:
        converting the reflection points to Cartesian coordinates in a scanner-centric frame on a scan line by scan line basis; and
        determining a gradient along a dimension of at least one of the scan lines;
    fusing only the obstacle reflection points; and
    generating statistics associated with the obstacle.

2. The method of claim 1, wherein scanning the spatial area in elevation includes emitting a succession of light pulses and receiving a succession of reflected light pulses.

3. The method of claim 2, wherein emitting the succession of light pulses includes emitting the succession of light pulses over a predetermined angular range.

4. The method of claim 1, wherein sweeping the single axis laser range finder in azimuth includes sweeping the single axis laser range finder over a predetermined angular range.

5. The method of claim 1, wherein classifying each reflection point includes classifying each reflection point based on a gradient threshold.

6. The method of claim 1, wherein fusing the obstacle reflection points includes transforming the obstacle reflection points to a common coordinate frame at a predetermined rate.

7. The method of claim 6, wherein fusing the obstacle reflection points includes defining a cluster of obstacle reflection points.

8. The method of claim 7, wherein defining the cluster of obstacle reflection points includes defining the cluster based on nearest neighbor criterion.

9. The method of claim 7, wherein defining the cluster of obstacle reflection points includes defining more than one cluster of obstacle reflection points.

10. The method of claim 1, wherein generating statistics associated with the obstacle includes defining a height of the obstacle.

11. The method of claim 1, wherein generating statistics associated with the obstacle includes defining a width of the obstacle.

12. The method of claim 1, wherein generating statistics associated with the obstacle includes defining a distance the obstacle is positioned from a reference point.

13. The method of claim 1, wherein generating statistics associated with the obstacle includes defining an angle the obstacle is positioned relative to a reference point.

14. The method of claim 1, wherein generating the statistics associated with the obstacle includes filtering a cluster of obstacle reflection points.

15. The method of claim 14, wherein filtering the cluster includes filtering the cluster based on a size threshold.

16. A method for detecting an obstacle in a spatial area, the method comprising:
    scanning the spatial area in elevation with a single axis laser range finder at a first frequency while sweeping the single axis laser range finder in azimuth at a second frequency, wherein the first frequency is greater than the second frequency;
    classifying each reflection point in the spatial area as one of an obstacle reflection point and a non-obstacle reflection point on a scan line by scan line basis;
    fusing only the obstacle reflection points, wherein fusing the obstacle reflection points includes transforming the obstacle reflection points to a common coordinate frame at a predetermined rate; and
    generating statistics associated with the obstacle.

17. The method of claim 16, wherein fusing the obstacle reflection points includes defining a cluster of obstacle reflection points.

18. The method of claim 17, wherein defining the cluster of obstacle reflection points includes defining the cluster based on nearest neighbor criterion.

19. The method of claim 17, wherein defining the cluster of obstacle reflection points includes defining more than one cluster of obstacle reflection points.

* * * * *